United States Patent [19]

Klett

[11] 4,075,503
[45] Feb. 21, 1978

[54] EMERGENCY LIGHTING SYSTEM

[76] Inventor: Keith K. Klett, 203 E. 13th St., Danville, Ill. 61832

[21] Appl. No.: 718,029

[22] Filed: Aug. 26, 1976

[51] Int. Cl.² .......................... H02J 7/00; H02J 9/00
[52] U.S. Cl. ........................................ 307/66; 307/64
[58] Field of Search ................... 307/64, 66; 321/18; 315/86, 87

[56] References Cited

U.S. PATENT DOCUMENTS

| 3,129,373 | 4/1964 | Godshalk et al. | 321/18 |
| 3,836,815 | 9/1974 | Herzog | 307/66 |
| 3,921,005 | 11/1975 | Watrous | 307/64 |
| 3,925,772 | 12/1975 | Miller et al. | 307/66 |
| 4,029,993 | 6/1977 | Alley et al. | 307/66 |

Primary Examiner—Robert K. Schaefer
Assistant Examiner—Eugene S. Indyk

[57] ABSTRACT

An emergency lighting system including an inverter for operating a fluorescent lamp from a battery upon failure of the primary AC voltage source. A transformer connected to the AC source is provided with a single secondary winding for providing both current for charging the battery and a voltage proportional to the AC voltage to circuit inhibit means for allowing inverter operation when AC voltage falls below a predetermined level.

3 Claims, 1 Drawing Figure

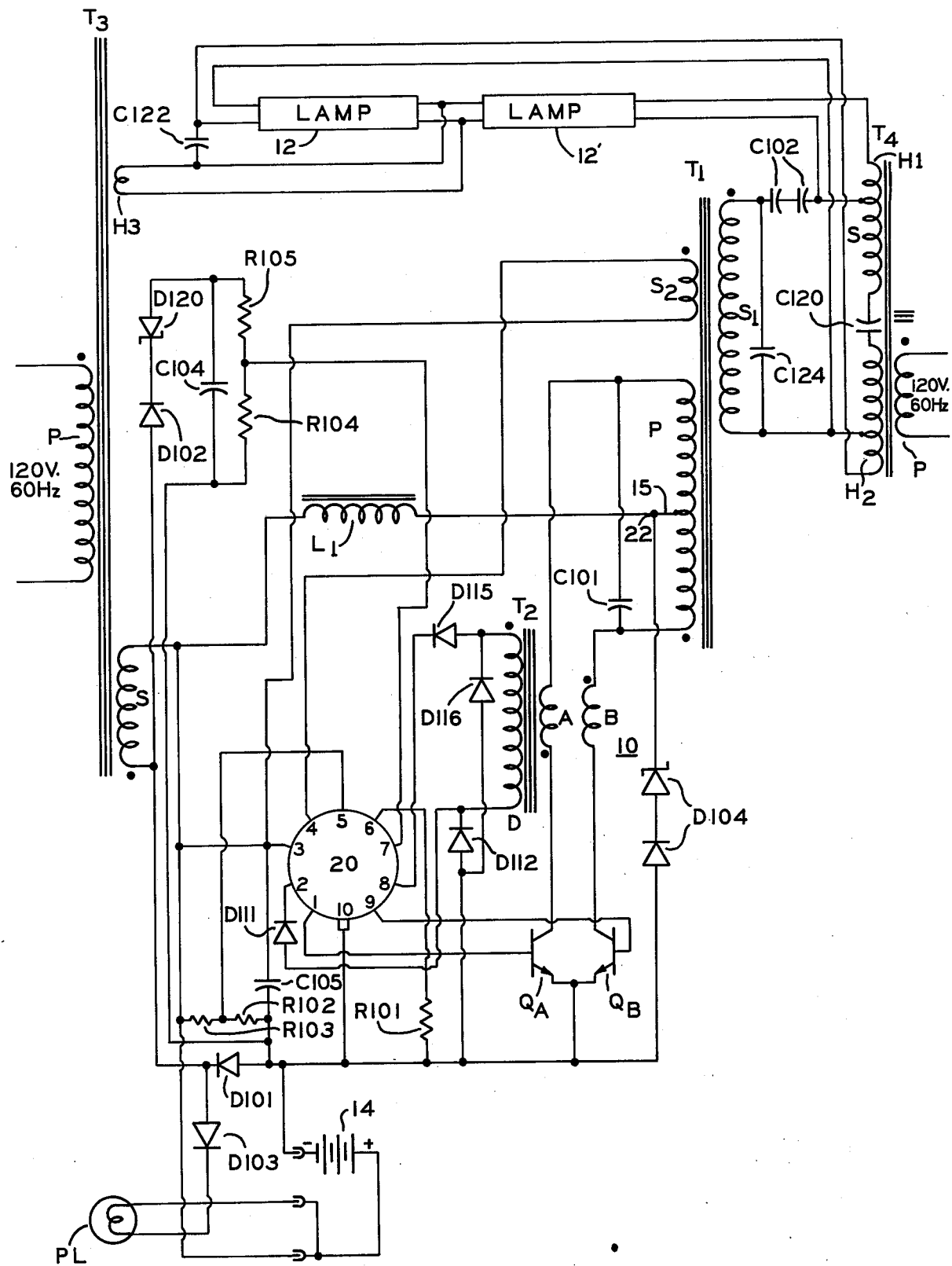

EMERGENCY LIGHTING SYSTEM

BACKGROUND OF THE INVENTION

I. Field of the Invention:

The present invention relates to an emergency lighting circuit for operating a gaseous discharge lamp from an auxiliary DC source upon failure of AC line voltage, and more particularly, to such an emergency lighting circuit improved to provide a transformer coupling the circuit with an AC line source, and which transformer includes a secondary winding and associated circuitry for performing a plurality of circuit functions in a substantially non-interacting manner.

II. Description of the Prior Art:

U.S. Pat. No. 3,906,243 - Herzog, assigned to the assignee of the present invention, discloses a retrofit emergemcy lighting system having means for reducing capacitive leakage current and inductive shunt current losses. One benefit thereof is the substantial reduction of the electric shock hazard possibly resulting from replacing a lamp during high frequency inverter circuit operation. However, the Herzog '243 patent discloses a lag ballast circuit for 60 Hz operation which inherently produces inefficient operation of a lamp, yielding light output of about 50% of lamp capability, in addition to having a low input power factor.

An improved circuit is disclosed in Application Ser. No. 718,028 filed Aug. 26, 1976, assigned to the assignee of the present invention and filed concurrently herewith. Therein is shown a lead ballast circuit for 60 Hz operation which produces higher light output using the same magnetics as in the Herzog 3,906,243 circuit. In a two lamp circuit, as shown therein, it is necessary to provide three filament heater windings. It is possible, in the Alley circuit, to place two of these windings over the secondary coil. There is, however, no room to place the third filament winding thereon. It was found that, when using an emergency lighting arrangement as shown in U.S. Pat. No. 3,921,005 -Watrous, (assigned to the assignee of the present invention), this third filament winding could be placed on the transformer T3 provided therein for battery charging and inverter hold-off or inhibit functions. This placement of the third filament winding on transformer T3 could be accomplished only if the secondary winding S thereon could be reduced in size. As shown in Watrous - 3,921,005, secondary winding S is center tapped to provide, during one half cycle of the AC voltage, charging current for battery 14 and during the other half cycle of the AC voltage, to provide half-wave current for the indicator lamp Pl and, also, to provide a signal to the first sensor at terminal 17 of control circuit 20 for monitoring AC source voltage thereby to operate an inverter hold-off or inhibit function. However, in an improvement on the Watrous circuit, it was found necessary to provide two separate secondary windings on transformer T3 to properly provide these functions, even though in Watrous, winding S was additive center-tapped.

It was found desirable therefore to provide room on an already overcrowded transformer for a third filament winding. Accordingly, it is an object of the present invention to provide space on the transformer for such a third filament winding by combining the functions of the hold-off or inhibit winding and the battery charging winding into a single secondary winding supported by necessary circuit components to prevent interaction of the circuit functions.

SUMMARY OF THE INVENTION

In accordance with the present invention, there is provided an emergency lighting system having an inverter circuit for operating at least one gaseous discharge lamp from a battery when AC voltage from an AC electrical energy source falls below a predetermined level. The system includes a transformer connected to the AC source, means for providing an indication that the battery is connected into the system and AC electrical energy is available for charging the battery, and inhibit means monitoring the AC voltage for enabling the inverter when the AC voltage falls below a predetermined level. Means including a single secondary winding on the transformer provide, in a substantially non-interacting manner, a voltage proportional to the AC voltage to the inhibit means and, electrical energy to charge the battery.

BRIEF DESCRIPTION OF THE DRAWING

The accompanying drawing shows, by schematic representation, a circuit for operating at least one gaseous discharge lamp during normal conditions from an AC line source, and upon failure thereof, from a battery, the circuit incorporating the preferred embodiment of the emergency lighting system circuit of the present invention.

DESCRIPTION OF THE PREFERRED EMBODIMENT

Referring to the drawing, there is a 60 Hz ballast useful during normal conditions for operating lamps 12 and 12' from a 120 V AC, 60 Hz primary electrical energy source. This 60 Hz ballast includes a transformer T4 having a loosely coupled primary winding P and a secondary winding S. A power capacitor C120 is included serially in circuit between two approximately equal portions of secondary winding S and serves to reduce leakage current and to reduce the transfer of EMI from the secondary side to the line side of the ballast, hence to ground. Such an arrangement forms no part of the present invention but is disclosed and claimed in Application Ser. No. 718,028 filed Aug. 26, 1976. assigned to the assignee of the present invention and filed concurrently herewith. A pair of heaters H1 and H2 are also provided on transformer T4 for supplying power to energize a pair of heater windings, located respectively, on the distal ends of the lamps 12 and 12'. The 60 Hz ballast also includes a starting capacitor C122.

Also shown is a circuit for an emergency lighting system which will automatically become operative upon failure of the primary AC electric source. Such a system is disclosed and claimed in U.S. Pat. No. 3,921,005 - Watrous, assigned to the same assignee as the present invention, which patent is specifically incorporated herein by this reference.

A tuned inverter 10 includes a pair of power transistors QA and QB capable of operation in a low loss switching mode to energize a load such as at least one gaseous discharge lamp 12' (lamp 12 is shorted out at high frequency by capacitor C122) when the AC voltage falls below a predetermined level. An auxiliary electrical energy source in the form of a rechargeable battery 14 provides the power necessary to operate inverter 10 and therefore the lamp 12'. A buffer inductance L1 serves to enable transistors QA and QB to operate in a low loss switching mode. A first transformer T1 couples inverter 10 with the lamp 12' and is resonated with capacitors C101, C102, and C124 to set the operating frequency of the inverter and to establish a sinusoidal output voltage. Inductor L1 is electrically connected with center tap 15 of primary winding P1 forming a part of transformer T1.

A control circuit 20 (in this preferred embodiment, an integrated circuit) is provided for supplying base drive for switching transistors QA and QB at zero collector voltage. This is, when the instantaneous voltage across transformer T1 varies at fundamental frequency, the voltage at point 22 and hence across inductor L1 varies at twice the fundamental frequency. The current through L1 is DC with a second harmonic component. This same current is alternately carried by the two transistors QA and QB. While the transistors are required to switch collector current, they do so at essentially zero collector voltage with a resultant low power dissipation.

An auxiliary winding S2 magnetically coupled with the primary winding P of first transformer T1 provides timing information to the control circuit 20 for effecting switching off the respective transistors QA and QB in step with the natural resonant frequency of the inverter. Thus, the control circuit 20 tracks the resonant frequency of first transformer T1 and insures that transistor switching occurs when the voltage across capacitor C101 is zero. Winding T1 S2 is not used as a source of energy for driving the transistors QA and QB because of its sinusoidal waveform.

A feedback transformer T2 is provided to supply a feedback current to control circuit 20 for effecting transistor base drive proportional to transistor collector current thereby to effect higher efficiency in the inverter 10. Feedback transformer T2 has a feedback winding D magnetically coupled to the respective collectors of transistors QA and QB through a pair of windings A and B, respectively. Thus, the power consumed by the control circuit 20 can be limited to that required to start and control the oscillation of the inverter 10.

Control circuit 20 also includes a first sensor (not shown) in the form of an AC voltage inhibit subcircuit, inhibit means, having an input at terminal 7 for monitoring the AC voltage inhibit subcircuit, inhibit means, having an input at terminal 7 for monitoring the AC voltage thereby to prevent the operation of inverter 20 when the AC voltage is above a predetermined level. Further details of the operation of control circuit 20 and indeed of the entire emergency lighting system, may be had by referring to the aforementioned Watrous 3921005 patent.

An impedance limited transformer T3 is provided and includes a primary winding P for connection to an AC electrical energy source such as a typical 120 volt, 60 Hz, Ac source. In accordance with the present invention, means are provided including a single secondary winding S associated with transformer T3 for providing in a substantially noninteracting manner a voltage proportional to the AC voltage to the inhibit means, the Ac voltage inhibit subcircuit of control circuit 20, and further, for providing energy to charge the battery 14. Halfwave charging current is coupled to a non-linear load, the battery 14, through diode D101 and is limited in magnitude by the impedance of the transformer T3. Because off the transformer impedance, the sinusoidal voltage at the terminals of winding S is clamped at the battery voltage when diode D101 conducts. Secondary winding S of transformer T3 also provides the energy necessary to operate indicator lamp PL thereby to indicate that the battery 14 is plugged into the system and AC electrical energy is available for charging the battery. With the circuit arrangement as provided, the battery 14 must be plugged in and 120 volt AC available to energize lamp PL to indicate that the battery is charging. For monitoring the AC source voltage, means are provided for coupling secondary winding S of transformer T3 with a linear load; to this end, capacitor C104 is charged through diode D102. This DC monitoring voltage is connected to the AC inhibit subcircuit of control circuit 20 at terminal 7 through the linear load, resistor divider network R104 and R105. The DC voltage at terminal 7 is proportional to the average value of the 60 Hz, 120 volt supply voltage and is not influenced by the aforesaid clamping action of the battery. A zener diode D120 is connected in circuit between diode D102 and capacitor C104 as shown to prevent the battery voltage from battery 14 from keeping inverter 10 biased off.

Through the inclusion of only a single secondary winding S on impedance limited transformer T3, it becomes possible to incorporate on this transformer heating winding H3 which will be used for assisting in the starting of the emergency lighting system. This is necessitated by a lack of physical space on transformer T4 forming a portion of the 60 Hz.ballast.

A tuning capacitor C124 is provided connected across the outputs of secondary winding S1 of transformer T1 and serves to stabilize the output frequency, under open circuit conditions, to a lower value which materially aids in reducing the capacitive displacement currents which may flow in the system. Such capacitive displacement currents must be less than 5 milliamperes to be considered safe. The addition of capacitor C124 does slightly reduce the overall efficiency of the inverter circuit, however.

With such a lighting system as shown, it is anticipated that transformer T3 will be energized whenever 120 volt, 60 Hz electrical energy is available. With transformer T3 being continuously energized, pilot lamp PL will always be lighted when electrical energy is available and charging current will be continuously provided to the battery 14 to maintain it in a fully charged condition. On the contrary, transformer T4 will only be energized when it is intended that the lamps 12 and 12' be lighted, there being normally provided a switching mechanism on the primary side of the transformer T4.

The emergency lighting system as shown in the drawing has been built and has operated satisfactorily with components as follows:

Transistors QA, QB GE D42C10
Transformer T1 Primary winding - 70 turns, tapped at 35 turns Load winding S1 - 1363 turns Feedback winding S2 - 7 turns
Transformer T2 Collector windings A & B - 8 turns Output winding D - 160 turns
Transformer T3 Primary winding P - 1690 turns Secondary winding S - 340 turns Heater winding H3 - 80 turns
Transformer T4 Primary winding P -812 turns Heater windings H1, H2 - 30 turns
Inductor L1 120 turns .0359 Lamps 12, 12' F40T12/RS
Battery 14 14.4 V DC
Resistor R101 15 K ohms
Resistor R102 56 K ohms Resistor R103 56 K ohms
Resistor R104 18 K ohms
Resistor R105 270 K ohms
Capacitor C101 0.68 uF
Capacitors C102 5000 pF each
Capacitor C105 0.01 uF
Capacitor C104 0.33 uF
Diodes D101, D102, D103 IN 4004
Diodes D111, D112, D115, D116 DA 1701
Zener Diodes D104 21 V ± 5%, ½ W (each)
Zener Diode D120 21 V ± 5% ½ W Control circuit 20 has been built and operated satisfactorily in both discrete circuit form and as a monolithic IC. Reference may be had to U. S. Pat. No. 3,921,005 - Watrous for further details.

It should be apparent to those skilled in the art that the embodiment described heretofore is considered to be the presently preferred form of this invention. In accordance with the Patent Statutes, changes may be made in the disclosed apparatus and the manner in which it is used without actually departing from the true spirit and scope of this invention.

What is claimed is:

1. In an emergency lighting system having an inverter circuit for operating at least one gaseous discharge lamp from a battery when AC voltage from an AC electrical energy source falls below a predetermined level, the system being of the type including a transformer connecting the system to the AC source, means for providing an indication that the battery is connected into the system and AC electrical energy is available for charging the battery, and inhibit means monitoring the AC voltage for enabling the inverter when the AC voltage falls below the predetermined level, the improvement comprising:

means including a single secondary winding on the transformer for providing in a substantially non-interacting manner a voltage proportional to the AC voltage to the inhibit means and electrical energy to charge the battery.

2. The invention of claim 1 wherein the means including a single secondary winding serves to provide the electrical energy necessary to operate the indication means.

3. The invention of claim 1 wherein a zener diode is connected in circuit between the single secondary winding and the inhibit means for preventing energy from the battery from inhibiting inverter operation through activation of the inhibiting inverter operation through activation of the inhibit means.

* * * * *